Patented July 12, 1949

2,475,847

UNITED STATES PATENT OFFICE 2,475,847

ACID TREATMENT OF NAPHTHACRIDINE TYPE VAT DYESTUFFS

Lawrence D. Lytle and John F. Cullinan, Plainfield, N. J., assignors to American Cyanamid Company, New York, N. Y., a corporation of Maine No Drawing. Application March 13, 1944, Serial No. 526,340

10 Claims. (Cl. 260—274)

This invention relates to an improved process of transforming vat colors into a form having a very fine and substantially uniform particle size.

More particularly, the present invention relates to an improved process whereby dyestuffs in the desired uniform, finely-divided state are obtained from vat dyestuffs of the naphthacridine or naphthacridone types, derived from the ring systems

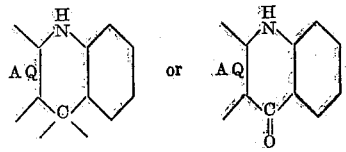

in which AQ represents the anthraquinone nucleus, and to which ring systems other ring systems may be fused. These dyestuffs may also be variously identified as phthaloyl-acridans or acridones and anthraquinone-acridines or acridones, depending upon the system of nomenclature used. Typical examples of dyestuffs with which the present invention is concerned are:

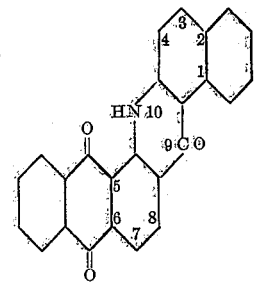

1,2-benzo-5,6-phthaloyl-acridone

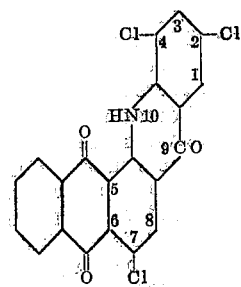

2,4,7-trichloro-5,6-phthaloyl-acridone  II

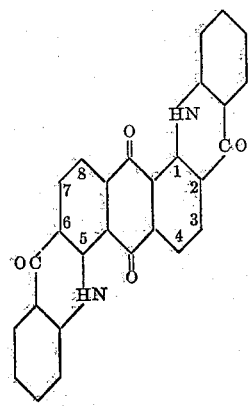

Anthraquinone 1,2,5,6-diacridone  III

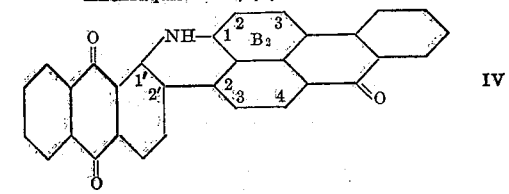

Bz1,1′-imino-2-(2′-anthraquinonyl) benzanthrone  IV

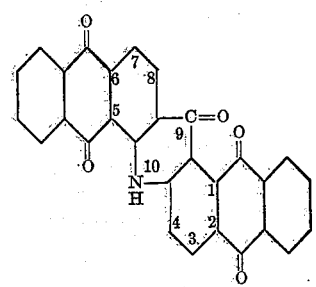

1,2,5,6-diphthaloyl-acridone  V

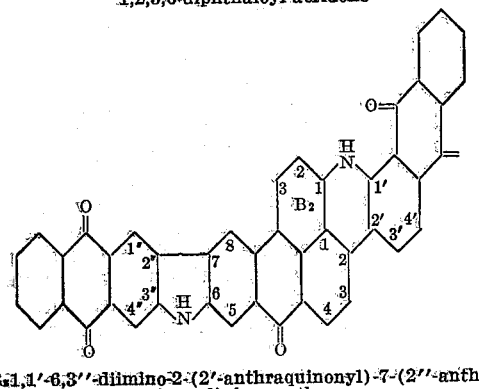

Bz1,1′-6,3″-diimino-2-(2′-anthraquinonyl)-7-(2″-anthraquinonyl) benzanthrone  VI As is well known, vat colors are normally obtained as coarse crystalline materials or as relatively large agglomerated particles. In this state, they are unsuitable for use in printing, pigment dyeing, emulsion printing and like operations. As a consequence, various procedures have been proposed to reduce their particle-size and thereby improve their penetrating ability and reactivity.

Commercially, the most common of these processes comprises the steps of dissolving the pigment in concentrated sulfuric acid and reprecipitating it by dilution with water, usually by drowning the entire solution in a large excess of water. Modifications have been proposed in which the dilution is carried out in other ways. These have included, for example, addition of dilute sulfuric acid in a quantity only sufficient to precipitate a sulfate which can be collected and hydrolysed; or accomplishing the dilution with water of crystallization by using such hydrated materials as Glauber's salt and the like. The effect of varying the operating temperatures has also been proposed as a means of control.

While the art has succeeded in obtaining finer particle sizes, the importance of uniformity and its necessary relation to fineness was not properly considered. In general, therefore, vat colors as prepared according to the teachings of the prior art generally lacked sufficient uniformity of particle size and contained larger particles in addition to the small ones. As a result, there remained a demand for a method adapted to produce a more finely divided color of more uniform size.

It is, therefore, a principal object of the present invention to develop such a process, capable of producing particles having the desirable properties of fineness and uniformity of particle size. In general, the desired object is accomplished through an improved process of carrying out the treatment of the materials with sulfuric acid.

According to the present invention, it has been found that in the treatment with sulfuric acid, there is for each material a specific range of acid concentrations which produce the optimum result. In addition, it has been found that the proportions between the dissolved and undissolved material at any stage in the process is of equal, if not greater importance. This involves not only the acid concentration, but also the total amount of acid present. Variations also result from changing the temperature at which the reaction is carried out, the procedure by which the correct acid concentration is reached and to a lesser extent with the time of contact. All must be reasonably controlled for the best results.

In developing the present process, the optimum acid concentration and amounts are such that only a very small quantity is dissolved and the dye is precipitated as its sulfate. It is necessary that the dyestuff has some solubility, otherwise it cannot be converted into a sulfate, and it is further necessary that at least one of its sulfates be slightly less soluble. It is the recognition and use of this differential solubility between the dyestuff and its sulfate which is responsible for the surprisingly improved results obtained by the process. The dyestuff, being slightly soluble, goes into a solution as such and is converted to its sulfate. But because the salt is less soluble, the solution becomes supersaturated with respect to the sulfate and the latter separates out.

It should be noted that at any given time the solution of the sulfate is exceedingly dilute. Consequently, the dissolved molecules are relatively far apart and their rate of aggregation in precipitating the insoluble sulfates is very low. At the same time, because the concentration of sulfate remains essentially constant during the entire precipitation, the precipitated products, are not only very finely divided but have a very uniform size. Probably due to a pseudomorphosis, this fineness and uniformity is retained when they are subsequently hydrolyzed with water, either with or without being previously isolated.

Expressed in general terms, therefore, the process of the present invention comprises the treatment of vat dyestuffs of the naphthacridine or naphthacridone types with the correct amount of sulfuric acid having the optimum concentration. At the same time, the proper degree of care in exercised in bringing the acid to the correct concentration before use and in maintaining a substantially uniform temperature throughout the process.

According to the above considerations, the principal factors to be controlled are: (1) the acid concentration; (2) the amount of acid; (3) the temperature; and (4) the manner of reaching the optimum acid concentration. Each of these has a direct bearing on the treatment of any particular dyestuff. Consequently, each factor is subject to certain limitations.

As far as the acid concentration is concerned, the individual dyestuffs vary widely in their optimum acid ranges. For any particular dyestuff the exact acid range most suitable thereto can not be assigned numerical limitations which will in turn be applicable to all cases. Functionally, a more exact limitation can be assigned in terms of solubility. The lower limit is that acid concentration at which the specific dyestuff has a slight solubility. The upper limit is that concentration at which a sulfate of the dyestuff has only a very limited solubility so as to form readily a supersaturated solution of the sulfate.

In treating the naphthacridine and naphthacridone type dyestuffs of the present invention, it is important that the sulfuric acid be diluted to the proper concentration before being used. If the dyestuff is dissolved first in concentrated acid and the resultant solution is then diluted to the proper strength, the desirable result is not obtained. In some cases, as for example with the dyestuff indicated above in Formula 4, the dyestuff itself is attacked by the concentrated acid. In other cases, as for example with the dyestuff shown above in Formula 3, only a coarse material is obtained because precipitation by diluting a rather concentrated solution favors the formation of large particles so that it is desirable to have the initial concentration as low as is practically possible.

Coming now to the amount of acid, at least 90% of the solid products present should remain undissolved at any point in the process. Preferably, the undissolved material should be as great as practically possible so that 98%, or more, remains undissolved. Because the amount of undissolved material present during the process is an important consideration, there is obviously an inter-relation between the acid concentration and the amount of acid used. The latter, however, is not as critical as the former. As pointed out above, the amount of acid used may vary. To a certain extent this is limited by practical considerations. Obviously, an insufficient amount of acid produces a very thick, unstirrable slurry. On the other hand, too great an amount of acid is impractical because of the volume required and the consequent decrease in the productive capacity of the equipment. At the same time, too great an amount of acid will dissolve excessive amounts of the dyestuff and sulfate. As was indicated above, this undesirable if the optimum fineness and uniformity of particle size is to be obtained.

For all practical purposes, the amount of acid used will be found to be about 10 to 40 parts per part of dyestuff. However, in all but extreme cases, these limits can be considerably narrowed. It is usually found that good results will be obtained using between about 20 to 30 parts of acid per part of dyestuff. Because of the relation to the acid concentration, the amount in some cases may require adjustment with respect thereto.

Because in effect, it is the solubilities of the various materials which it is necessary to control, the problem of temperature cannot be overlooked. Marked changes in temperature will alter the solubility of materials in any designated strength of acid. Therefore the temperature of the reaction should not be allowed to vary during the course of the reaction sufficiently to appreciably affect the solubility. It is most convenient to work at approximately room temperature. Consequently, the experimental data taken in developing the present invention is based on temperatures of about 25-35° C. However, should it become desirable to operate at higher or lower temperatures, an adjustment in either or both the strength and amount of acid to compensate therefor can be readily made in accordance with the solubility limitations set forth above.

The time cycle should also be considered. Obviously, if the time of contact is too short, all of the pigment will not be converted into finely-divided sulfate. On the other hand, if the time of contact is unduly prolonged, particles of precipitated sulfate will gradually grow because of the known tendency of crystals to increase in size when maintained in contact with a saturated solution of the mother liquor. There is some inter-relation between the time cycle and the acid concentration. However, in the instant invention, this is relatively unimportant since the range of optimum acid concentrations is so close that the time cycle varies but little between the upper and lower limits.

After conversion to the finely-divided sulfate is complete, the dyestuff must be hydrolysed. This may be done either before or after isolation. A good general practice is to drown the slurry in about 4 to 8 times its volume of water. The precipitated product may then be isolated after diluting the solution to a convenient acid strength for practical filtration. Subsequently, the dyestuff is usually washed on the filter until neutral. Preferably, but not necessarily, this washed filter cake is subjected to further treatment with a suitable deflocculating agent.

As an indication of the efficiency of the process, the following test has been found particularly useful. About 100-200 mg. of dispersed dyestuff is suspended in 200 ml. of distilled water at about 50° C. and approximately one-half of this suspension is poured on a three-inch conical, glass filter funnel fitted with a dry No. 1 Whatman filter paper. The suspension is allowed to filter by gravity. If the dyestuff is finely divided and uniformly dispersed, most of it should go through the filter into the filtrate, and the residue on the paper should be small.

Test dyeings are then carried out, using the filtrate and the unfiltered portion of the suspension, the strengths of the resultant dyeings being compared. The filtrate of a well-dispersed product gives a dyeing having about 75-90% the strength of the unfiltered product. It is readily apparent that the greatest dye strength from the filtrate is obtained only when the procedure of the present invention has been carried out so as to produce a maximum of finely divided particles of uniform size.

It is surprising, and entirely unexpected, in view of the prior art teaching that the use of more concentrated acids than are indicated by the limits of the present process produces a great amount of coarser particles as shown by the filtration test. Probably it is due to the fact that the strengths of acids usually prescribed by the prior art have too great a solvent action on the dyestuff. As a result the solute molecules are closer together and have a greater chance to precipitate as larger particles of the sulfate. Obviously also, still more concentrated acid will dissolve substantially the dyestuff, so that the sulfate will be precipitated only after dilution. This is the customary old acid pasting method and subject to all the ordinary faults which have been noted above.

Thus the principal advantage of the present invention lies in its ability to produce very small particles of uniform size. The uniformity of small particle size is of great importance, for example, in a pigment padding process. In such a process, fineness is essential to good penetration but if the particle size is not uniformly small, the coarser particles do not penetrate to the same extent as the finer material and uneven dyeings result. Similarly, in printing vat dyestuffs a fine product size is important in order that reduction may take place quickly but if uniformity is lacking the resultant print is not properly level.

The invention will be more fully explained in connection with the following examples which are meant to be illustrative only and not by way of limitation. All parts are by weight unless otherwise noted.

*Example 1*

One part of Bz1,1'-imino-2-(2"-anthraquinonyl) benzanthrone the formation of which is given above as No. IV, was treated with 30 parts of sulfuric acid of varying strength at 25-30° C. for 17 hours. An 85% sulfuric acid gave a product containing a very considerable amount of coarse material. In a filtration test, the filtrate gave only 20% dyeing strength compared with the unfiltered product. Using sulfuric acid of 88.9% strength produced a very uniform, fine particle size, the test filtrate dyeing 85% strength of the unfiltered product. This concentration of the acid was found to approximate the optimum. During the slurrying with the optimum strength, the dyestuff sulfate precipitated in the form of fine black crystals. 90.3% sulfuric acid still gave a very finely divided dyestuff, the test filtrate dyeing 80% strength of the unfiltered product. However, a 92.5% sulfuric acid gave more of the coarser material and the test filtrate dyed only 70% strength of the unfiltered product. It is therefore apparent that the acid concentration passed through a definite optimum.

With this specific dyestuff the advantages obtained by the present process are very great. Concentrated sulfuric acid decomposes the dyestuff and it cannot be treated according to the proposals of the prior art. For the same reason it is not feasible either to dissolve the dystuff first in concentrated sulfuric acid and then dilute to a lower strength acid of say 90%.

*Example 2*

One part of anthraquinone 1,2,5,6-diacridone represented above by Formula No. III, was treated with 25 parts sulfuric acid of various strengths for 18 hours. A 60% acid gave a rather coarse material, the test filtrate showing only 25% of the dyeing strength of the unfiltered product. However, a 65% acid gave an excellent, finely-dispersed material; the test filtrate showing a dyeing strength of 80-90% that of the unfiltered product. An increase in the acid concentration to 70% again gave a coarse material; the dyeing strength of the test filtrate being only 25% when compared with the unfiltered material. The sulfate, precipitated in the optimum concentration of approximately 65% is violet, while a sulfate precipitated from 70% sulfuric acid is yellow.

When the same dyestuff is first dissolved in 90% sulfuric acid, and this solution is diluted to obtain a slurry of one part of the dyestuff in 25 parts sulfuric acid having the optimum concentration of 65%, and is stirred for 18 hours, a rather coarse material is obtained, the test filtrate showing only 25% of the dyeing strength when compared with the unfiltered product.

There is one exception wherein the process of the present invention does not work well, that is in the case of dyestuffs which themselves comprise mixtures of two or more products, such as are often obtained in chlorinations or brominations or in processes which are not well understood chemically. It is easy to see that such mixtures do not respond to the new method if each component requires a different optimum acid strength. This is mostly the case.

We claim:

1. The method of converting a single vat dyestuff belonging to the group of naphthacridine and naphthacridone dyes into very finely divided particles of substantially uniform size which comprises forming a slurry of the dyestuff with from about 20-40 parts by weight per part of dyestuff of an aqueous sulfuric acid solution of such concentration that at the reaction temperature at least a part, but not more than 10%, of the total dyestuff is in solution at any one time, agitating this slurry until conversion of the dyestuff to a substantially insoluble sulfate thereof is substantially complete and hydrolyzing the sulfate to the dyestuff.

2. A method according to claim 1 in which for the amount of acid used the concentration is so selected that not more than 2% of the dyestuff is in solution at any one time during the operation.

3. The method of converting a single vat dyestuff comprising anthraquinone-1,2,5,6-diacridone into very finely divided particles of substantially uniform size which comprises forming a slurry of the dyestuff with from about 20-40 parts by weight per part of dyestuff of an aqueous sulfuric acid solution of such concentration that at the reaction temperature at least a part, but not more than 10%, of the total dyestuff is in solution at any one time, agitating this slurry until conversion of the dyestuff to a substantially insoluble sulfate thereof is substantially complete and hydrolyzing the sulfate to the dyestuff.

4. A method according to claim 3 in which for the amount of acid used the concentration is so selected that not more than 2% of the dyestuff is in solution at any one time during the operation.

5. A method according to claim 3 in which the amount of acid used is from 20-30 parts by weight of acid per part of dyestuff.

6. A method according to claim 3 in which 20-30 parts by weight of sulfuric acid solution of a concentration from about 62.5-67.5% is used.

7. The method of converting a single vat dyestuff comprising $B_z$-1,1'-imino-2-(2'-anthraquinonyl) benzanthrone into very finely divided particles of substantially uniform size which comprises forming a slurry of the dyestuff with from about 20-40 parts by weight per part of dyestuff of an aqueous sulfuric acid solution of such concentration that at the reaction temperature at least a part, but not more than 10%, of the total dyestuff is in solution at any one time, agitating this slurry until conversion of the dyestuff to a substantially insoluble sulfate thereof is substantially complete and hydrolyzing the sulfate to the dyestuff.

8. A method according to claim 7 in which for the amount of acid used the concentration is so selected that not more than 2% of the dyestuff is in solution at any one time during the operation.

9. A method according to claim 7 in which 25-35 parts by weight of acid per part of dyestuff is used.

10. A method according to claim 7 in which 25-35 parts by weight of acid of from about 87-92% concentration is used per part of dyestuff.

LAWRENCE D. LYTLE.
JOHN F. CULLINAN.

REFERENCES CITED

The following references are of record in the file of this patent:

UNITED STATES PATENTS

| Number | Name | Date |
|---|---|---|
| 1,145,934 | Steindorff et al. | July 13, 1915 |
| 1,929,847 | Nawiasky et al. | Oct. 10, 1933 |
| 1,936,716 | Honold | Nov. 28, 1933 |
| 1,969,210 | Detwiler | Aug. 7, 1934 |
| 1,994,025 | Neresheimer | Mar. 12, 1935 |
| 2,065,928 | Waldron | Dec. 29, 1936 |
| 2,081,874 | Lycan | May 25, 1937 |
| 2,131,419 | Herrett | Sept. 27, 1938 |
| 2,141,858 | Graham | Dec. 27, 1938 |
| 2,188,537 | Graham | Jan. 30, 1940 |
| 2,284,685 | Detrick | June 2, 1942 |
| 2,312,462 | Wuertz | Mar. 2, 1943 |

FOREIGN PATENTS

| Number | Country | Date |
|---|---|---|
| 313,724 | Germany | Jan. 20, 1921 |
| 347,692 | Germany | Jan. 24, 1922 |

Certificate of Correction

Patent No. 2,475,847                              July 12, 1949

LAWRENCE D. LYTLE ET AL.

It is hereby certified that errors appear in the printed specification of the above numbered patent requiring correction as follows:

Column 2, lines 40 to 46, for that portion of the formula reading

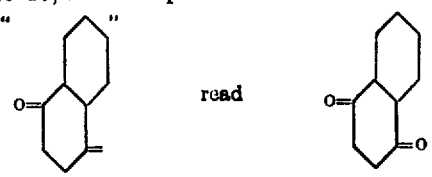

column 4, line 18, for "in" before "exercised" read *is*; column 5, line 6, after "this" insert *is*; column 6, line 30, for "The" read *This*;

and that the said Letters Patent should be read with these corrections therein that the same may conform to the record of the case in the Patent Office.

Signed and sealed this 31st day of January, A. D. 1950.

[SEAL]

THOMAS F. MURPHY,
*Assistant Commissioner of Patents.*